O. SLAGLE.
HARROW.
No. 193,292. Patented July 17, 1877.
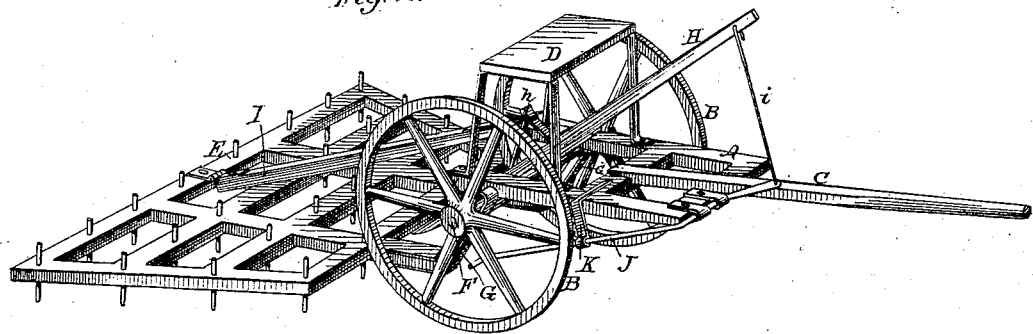
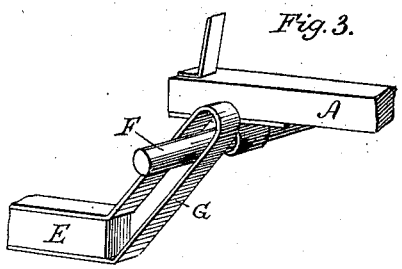
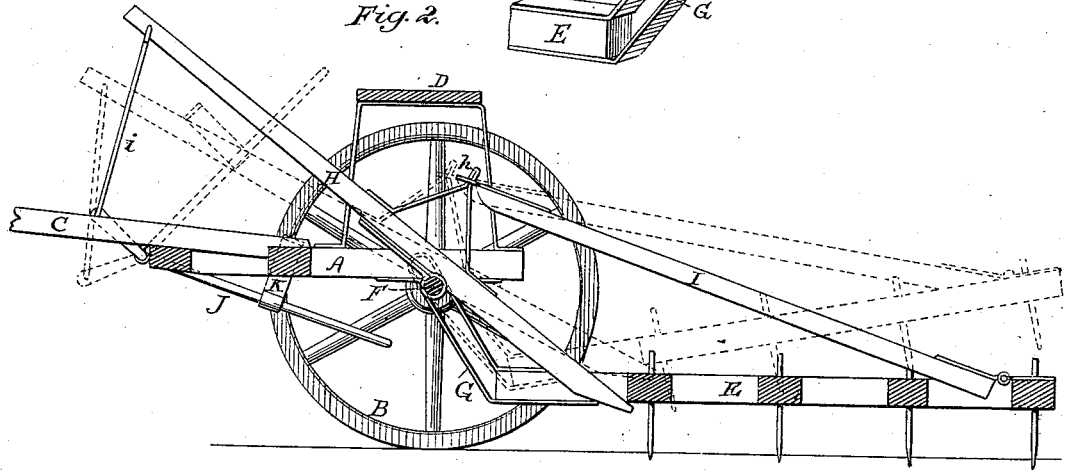
WITNESSES:
C. Clarence Poole
Aug. Jordan
INVENTOR:
Oliver Slagle
By his Atty R. D. O. Smith

UNITED STATES PATENT OFFICE.

OLIVER SLAGLE, OF LONDON, OHIO.

IMPROVEMENT IN HARROWS.

Specification forming part of Letters Patent No. 193,292, dated July 17, 1877; application filed June 14, 1877.

*To all whom it may concern:*

Be it known that I, OLIVER SLAGLE, of London, in Madison county, in the State of Ohio, have invented a new and useful Improvement in Harrows, and that the following is a full and exact description of the same, having reference to the annexed drawings, wherein—

Figure 1 is a perspective view of my harrow. Fig. 2 is a longitudinal section of the same. Fig. 3 is a perspective, showing the slotted connection or loop between the harrow and sulky.

My invention relates to that class of harrows which have a wheeled frame attached, whereon the driver rides; and it consists, first, in the method of attaching the harrow to the sulky; second, in the controlling-lever, whereby the driver on his seat may manage the harow; third, in the arrangement of a foot-lever, whereby said controlling-lever may be managed without the use of the hands; fourth, in a steady-brace hinged to the rear edge of the harrow, and capable of rigid connection to, or disconnection from, the controlling-lever, so that the rear edge of the harrow may be free to rise or fall, or may be rendered rigid, and depressed with a force proportionate to the weight of the carriage.

That others may fully understand my improvement, I will particularly describe it.

A is the sulky-frame, supported upon the bearing-wheels B B, and provided with the rigid tongue C and the driver's seat D. The horses are attached in the usual way, and the harrow may be entirely guided and managed by the driver while on his seat.

E is the harrow-frame, which may be in any desired shape, and any desired style of teeth may be employed, as neither of these concerns my invention.

The harrow E is joined to the axle F of the wheels B B by means of slotted connections or loops G, which encircle the axle F, and are rigidly secured to the harrow, so that it may rise up bodily or at its rear edge. With the loops G, which stand slightly inclined forward, the forward motion of the carriage and axle F tends to depress the front edge of the harrow and force the teeth into the ground.

A lever, H, is pivoted upon the frame A, or upon the axle B, as shown, so that its rear end projects beneath the front bar of the harrow E, and its front end extends upward in front of the driver's seat, so as to be within reach of his hand or foot. By depressing the front end of the lever H the whole harrow may be raised from the ground, as shown by dotted lines in Fig. 2, to facilitate its transportation along the road, or from field to field, or while turning at the corners.

A brace, I, extends from the rear edge of the harrow-frame to the lever H, to which the front end of said brace is secured, either permanently or detachably, for the purpose of depressing the rear edge of the harrow when the front end of the lever H is raised upward, and to augment this effect I place upon said lever a standard, $h$, the top of which is perpendicular to the surface of said lever at a point over the axle F, and the front end of the brace I is attached to the upper end of said standard, as shown. The top of the standard $h$ moves in the arc of a circle, to which the brace I is tangent; and, therefore, the movement of the lever H is applied to the brace I, in the most advantageous direction, to depress the rear edge of the harrow.

The foot-lever J is fulcrumed upon the main frame at its front edge, and is connected with the lever H by a rod, $i$, so that when said foot-lever is depressed the lever H will be elevated and the harrow depressed at its rear edge. A foot-piece, K, is attached to the lever J, so that the foot of the driver may hold the lever J down, and, if thought advisable or advantageous, a mechanical holding device may be employed for that purpose. Many such devices are in well-known use on harvesters.

Having described my invention, what I claim as new is—

1. A wheeled sulky, A, and harrow E, combined with rigid inclined slotted connections or loops G, whereby the harrow at its forward end will be depressed by the forward motion of the sulky, but may be permitted to rise or fall independent of the sulky, substantially as set forth.

2. A wheeled sulky, and harrow attached thereto by rigid loops G, combined with a lever, H, fulcrumed upon the axle or frame of said sulky, substantially as shown, and, at its rear end, engaged with the front bar of the harrow, for the purpose of lifting the same at will.

3. A wheeled sulky, A, and the harrow E attached thereto, and provided with a lifting-lever, H, arranged to lift the harrow at its front end, combined with a brace, I, joined to the rear edge of the harrow, and capable of engagement, loosely at its front end, to said lifting-lever, for the purpose of depressing the rear end of the harrow, as set forth.

4. The lifting-lever H, arranged to lift the harrow at its front end, provided with the standard $h$, combined with the brace I hinged to the harrow near its rear edge, and capable of engagement with said standard near its top, as set forth.

5. The lifting-lever H and brace I, combined with the foot-lever J, whereby pressure of the driver's foot may be employed to push the lifting-lever H upward, and thus forcibly depress the harrow, as set forth.

OLIVER SLAGLE.

Witnesses:
  H. T. STRAWBRIDGE,
  THOMAS L. EDWARDS.